United States Patent [19]

Schneider

[11] 4,203,018
[45] May 13, 1980

[54] METHOD AND APPARATUS FOR ERODING INNER AND OUTER WALLS OF WORK PIECES

[75] Inventor: Rudolf Schneider, Reinach, Switzerland

[73] Assignee: Erowa AG, Reinach, Switzerland

[21] Appl. No.: 860,069

[22] Filed: Dec. 13, 1977

[30] Foreign Application Priority Data

Dec. 17, 1976 [DE] Fed. Rep. of Germany ....... 2657357

[51] Int. Cl.[2] .............................................. B23P 1/12
[52] U.S. Cl. .................................. 219/69 V; 219/69 M
[58] Field of Search ............... 219/69 M, 69 V, 69 G, 219/69 R, 69 E; 90/15 A, 15 B

[56] References Cited

U.S. PATENT DOCUMENTS

| | | | |
|---|---|---|---|
| Re. 26,970 | 10/1970 | Bentley et al. | 219/69 V |
| 2,773,968 | 12/1956 | Martellotti et al. | 219/69 V |
| 3,539,754 | 11/1970 | Furze et al. | 219/69 V |
| 4,104,501 | 8/1978 | Wyss | 219/69 V |

Primary Examiner—Bruce A. Reynolds
Assistant Examiner—Clifford C. Shaw

[57] ABSTRACT

A method and apparatus for eroding inner and outer walls of work pieces, such as cylinders and cones, by electrical discharge between the work piece and an electrode are described wherein an electrode-holder is mounted for variable orbital movement on a hollow support fixed on a cylinder axially movable by fluid pressure with respect to a piston therein, along an axis perpendicular to the plane of the orbital movement. A normally fixed piston rod carries the piston, and a shaft extends through the piston rod from the interior of the support to means, providing for coarse and fine adjustment, fixing the shaft to the rod. A rotor in the support is rotatable on the shaft and has an inclined track with which an inclined track on a cam unit is in sliding engagement. The cam unit is rotated on the electrode-holder by power means supported thereby and the cam unit rotates on an axis parallel to the shaft and which orbits about the shaft at a radius depending on the relative position of the two cam tracks which orbit with the electrode-holder. Alteration of the orbit radius or eccentricity is effected either by adjustment of the shaft in the piston rod or by axial movement of the cylinder which is limited in each direction by stops. In the event of excessive pressure arising in the cylinder the piston rod can yield axially against resilient restraint.

9 Claims, 6 Drawing Figures

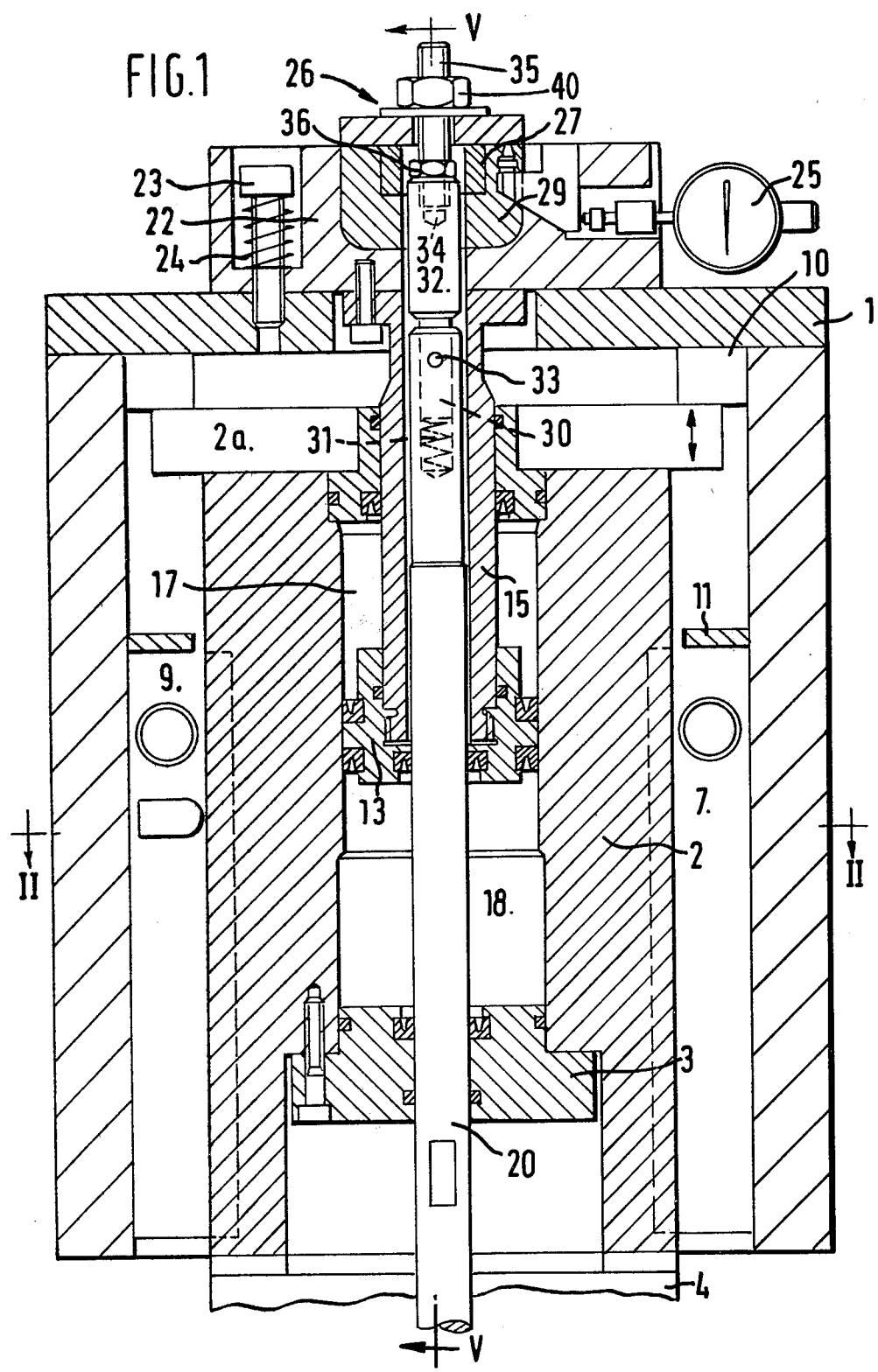

METHOD AND APPARATUS FOR ERODING INNER AND OUTER WALLS OF WORK PIECES

FIELD OF THE INVENTION

This invention relates to a method of and an apparatus for eroding work pieces by electrical discharges between an electrode and the work piece, the electrode being movable along its longitudinal axis as well as within a plane perpendicular to said longitudinal axis.

DESCRIPTION OF THE PRIOR ART

Such a method became known from Swiss Pat. No. 494,085, according to which the electrode is introduced into the work piece while eroding, wherefore the electrode is working with the side of its end surface. This method is extremely time-wasting and the electrode is subject to a great abrasion at its working surfaces.

The device for effecting this known method works with two cranks whereby the phase relation of the two cranks results in a variable angle therebetween and a variable total electrode movement. A control unit, for causing a retardation for one of the cranks, determines the angle between the two cranks. This device has an extremely complicated action as well as construction.

SUMMARY OF THE INVENTION

An object of this invention is to avoid the disadvantages of known methods and to achieve a method for eroding work pieces which ensures faster work and which causes less abrasion of the electrode.

A further object of the invention is to provide a method to which not only vertical surfaces but also inclined surfaces such as inner and outer cones as well as incisions and under-cutting may be eroded. A further object of the invention is to provide a device for carrying out the new method that provides a more simple construction and is easier to control.

A method according to the invention comprises the steps of moving the electrode-holder relatively to a work piece to bring the electrode rectilinearly to the plane of the required erosion machining, adjusting the clearance between the electrode and the work piece within said plane to a required value by adjusting a radial distance of the electrode from an axis of a support for the electrode-holder, driving the electrode-holder to orbit said axis of said support with the electrode at said radial distance while the electrode is eroding the work piece, and varying said radial distance by longitudinal movement of a member along said axis of said support according to a fixed ratio between this movement and the said radial distance.

The device for carrying out the present method comprises a working cylinder guided within a housing of an eroding machine and having a support for the electrode-holder, in which a cam unit is rotatably mounted and in which a control unit for varying the eccentricity of the cam unit and of the electrode is located.

Said control-unit, said cam unit and said support are located on the longitudinal axis of the working cylinder, said working cylinder being movable within the housing along its longitudinal axis between two end-points limited by two stops and comprising a piston and a piston-rod, the piston-rod being so held on the housing by resilient means that, by increasing the pressure within a first chamber of the working cylinder, said working cylinder is moved upwards until stopped by the upper stop and that, by increasing the pressure within a second chamber of the working cylinder, said working cylinder is moved downwards until stopped by the lower stop. On excessive pressure appearing in the second chamber, the piston and the piston-rod are moved upwards against the resilient means. The apparatus further comprises a shaft for acting on the control-unit and an electrode-holder mounted on the support and movable orbitally in a plane perpendicular to the longitudinal axis of the working cylinder.

A more complete understanding of the present invention may be obtained from the following detailed description of an example of a method and an example of apparatus when read in conjunction with the accompanying drawings, wherein:

FIG. 1 is a longitudinal section of one part of an eroding machine;

FIG. 2 is a cross-section taken along line II—II in FIG. 1;

FIG. 5 is a partial section taken along line V in FIG. 1; and

FIG. 6 is a plan view of a portion of the Device of FIG. 1

Figure 3:
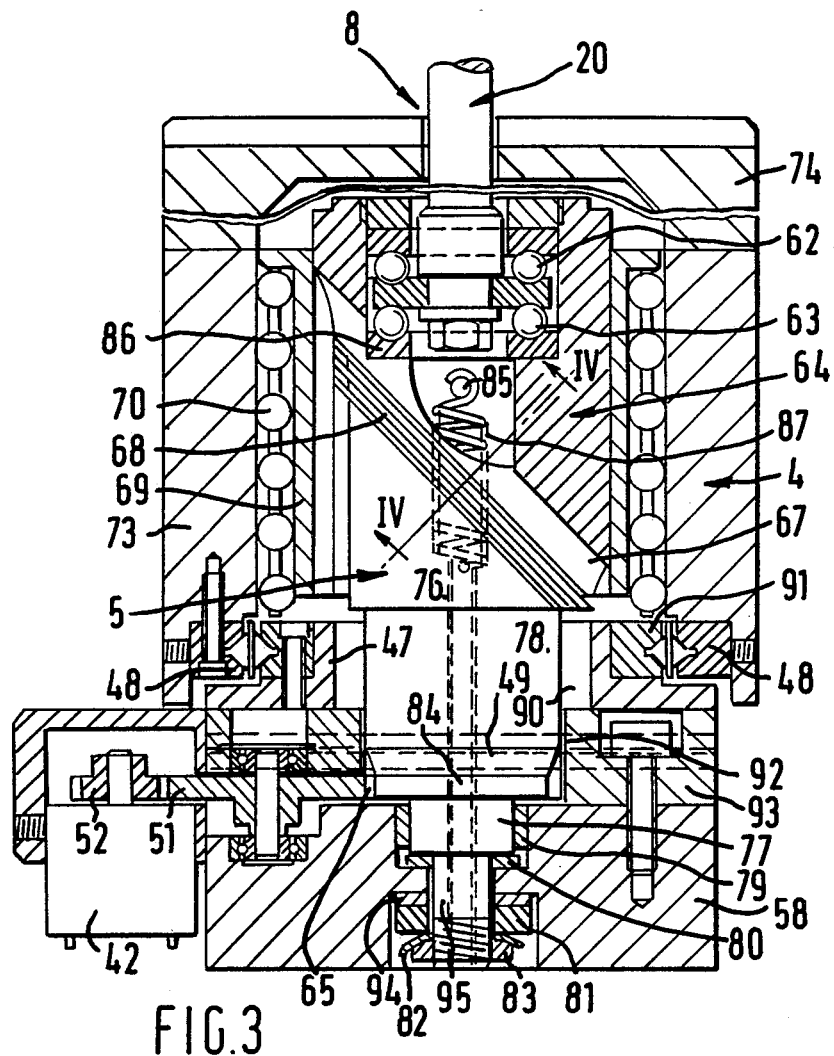
FIG. 3 is a longitudinal section of another part of the eroding machine.

The device according to FIGS. 1 and 2 for eroding inner and outer walls of work pieces is carried by a main cylinder of an eroding machine not shown in detail. This main cylinder permits coarse vertical adjustment of the device and therefore of an electrode.

This device comprises a housing 1 of the eroding machine in which housing a working cylinder 2 is guided in two guides 7, 9 and is movable along its longitudinal axis in the direction of the double-arrow in the upper right-hand side of FIG. 1. The upwards displacement of the working cylinder 2, with a projection 2a, is limited by a stop 10 located in the housing 1. The downwards displacement of the working cylinder 2 is limited by stops 11 mounted on the guides 7 and 9. At the lower end of the working cylinder 2 a support 4 for an electrode-holder 58 is mounted. The support 4 is shown in detail in FIG. 3.

The working cylinder 2 contains a piston 13 and is closed at opposite ends so that chambers 17, 18 are provided above and below the piston. Admission of pressure to the chamber 18 depresses the cylinder 2 towards the stops 11. Admission of pressure to the chamber 17 lifts the cylinder towards the stop 10. The lower end of the cylinder 2 is closed by a cover 3 through which a shaft 20 passes and the upper end is closed by a cover plate through which a piston-rod 15, fixed to the piston 13, passes. At its upper end the piston-rod 15 is fixed to a rod-support 22 located on the housing by three screws 23 and three springs 24 that can yield when excess upward pressure is applied to the rod-support 22.

The shaft 20 extends into the piston-rod 15 and has an axial bore at its upper end into which a spigot 30 on a guide rod 32 projects, a compression spring 31 being interposed between the spigot 30 and the end of the axial bore and the spigot 30 being fixed to the shaft 20 by a shear pin 33. A threaded pin 35 carrying a nut 40 is screwed into a threaded hole 34 in the upper end of the guide rod 32 and secured by a lock-nut 36.

Longitudinal adjustment of the shaft 20 with respect to the piston rod 15 is effected by an assembly shown in FIG. 5 as well as in FIG. 1. This provides for coarse adjustment by means of the unit 26 consisting of the pin 35, nut 40 and lock-nut 36 and for fine adjustment by means of a unit 28.

The nut 40 bears on a disc 42 with an intervening washer 41 and the disc 42 bears on a horizontal U-shaped member 27 having wedge-shaped limbs that bear on an inclined base surface of a vertical U-shaped member 29. These members 27, 29 are the main elements in the fine-adjustment unit 28, the fine adjustment being effected by moving the member 27 in the direction of the double arrow (FIG. 5) by means (not shown). The wedging action due to the horizontal movement of the member 27 results in vertical movement of the shaft 20. By choosing a small inclination of the wedge surfaces, an extremely fine adjustment of the shaft 20 may be achieved. A measuring instrument 25 is mounted on the rod-support for controlling the fine adjustment.

As shown in FIG. 2, the working cylinder 2 is a hollow square prism. The prism is guided on two angular needle bearings 6, 6a located in the guides 7, 9 at opposite longitudinal edges of the prism, allowing the prism to move longitudinally and securing it against rotating.

Figure 4:
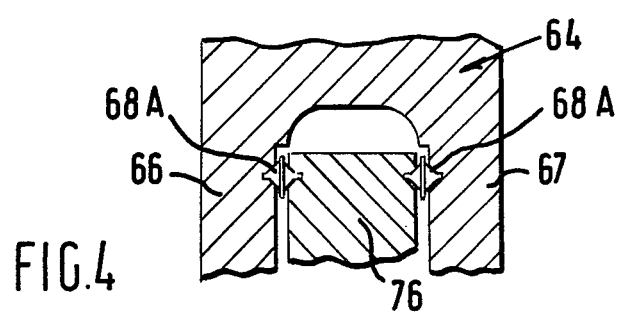
FIG. 4 is a section taken along line IV—IV in FIG. 3.

The support 4 mounted on the working cylinder 2 comprises, as shown in FIGS. 3 and 4, the shaft 20 and a control unit 8 located on the shaft. The lower end of the shaft 20 is longitudinally fixed to and rotatable with respect to a rotor 64 by means of two axial rolling bearings 62, 63. The rotor 64 is hollow and presents a forked lower part having two side-pieces 66 and 67 (FIG. 4). Each of the side-pieces 66, 67 is provided with one side groove of an inclined rectilinear guide 68 known under the name "Schneeberger Guide". The other side of each guide 68 is formed on a rectangular triangle 76 forming part of a cam unit 5. As shown in FIG. 4, the two side grooves confine bearing members 68A. Thus as described more fully below, axial movement of the rotor 64 causes displacement of the cam unit 5 in a horizontal direction. The rectilinear guides 68 are inclined with respect to the longitudinal axis of the rotor 64 at an angle of 45 degrees, as shown in FIG. 3. The rotor 64 is located within a cylindrical sleeve 69 on which a known form of rolling bearing 70 is mounted. The bearing 70 enables the rotor 64 not only to rotate but also to move along its longitudinal axis together with the cylindrical sleeve 69. The support 4 includes a cover plate 74 at its top. The cover plate 74 is provided with a hole through which the shaft 20 projects with clearance.

The cam unit 5 includes an upper journal 78 and a lower journal 77, both coaxial with the shaft 2 when the cam unit 5 is in the central position shown in FIG. 3.

The electrode-holder 58 is mounted for movement in a horizontal plane so as to enable the electrode (not shown) either to be rotated about the axis of the shaft 20 or to be caused to orbit about the axis, depending on the position of the cam unit 5 with respect to the rotor 64. A spring 87 tends to hold the cam unit 5 centrally with respect to the shaft 20, the spring being connected between a pin 85 on the rotor 64 and a screw 84 screwed axially into the cam unit.

The lower journal 77 of the cam unit is journalled in needle bearings 79, 80 in the electrode-holder 58 and the cam unit can be rotated on the electrode-holder by an electric motor 42 mounted on the electrode-holder 58 and provided with a driving pinion 52 connected by a gear wheel 51 to peripheral gear teeth 65 on the upper journal 78.

When the shaft 20 and rotor 64 are moved axially from the position of FIG. 3 to cause the guides 68 to displace the cam unit 5 and electrode-holder 58, the rotation of the cam unit 5 causes the assembly comprising the electrode-holder 58 and cam unit 5 to orbit in a horizontal plane about the axis of the shaft 20 while the rotor 64 rotates coaxially about the axis of the shaft 20. To enable this movement to take place, linear bearings at right angles are provided for the cam unit 5. Thus, the upper part of the upper journal 78 projects through a slot 90 in a member 47 carrying on each side a bar 91 forming one side of a linear bearing perpendicular to the section plane of FIG. 3. The other side of each such bearing is a bar 48 fixed to the support 4. The lower part 49 of the upper journal 78 passes through a slot 92 perpendicular to the slot 90 in a member 93 fixed to the electrode holder 58. Linear bearings, comprising bars 49, similar to the bearings 48, 91 are provided at each end of the slot 92 between the member 47 and the member 93.

The lower end of the cam unit 5 is provided with a spigot 95 which extends into a cavity in the base of the electrode-holder 58, wherein a nut 83 is screwed onto the spigot 95 to hold a bearing ring 81 in engagement with needle-bearings 94 interposed between the ring 81 and the electrode-holder 58 thereby locating the cam unit 5 axially on the electrode-holder 58.

If incisions, wider-surfaces or inclined surfaces are to be eroded, the coarse-adjustment unit and the fine-adjustment unit must be adjusted accordingly for the desired height. While introducing the electrode into or over the work piece, i.e. while moving the working cylinder 2 downwards by increasing the pressure within the second chamber 18, also the shaft 20 is moved downwards. The movement of the working cylinder 2 and therefore of the support 4 and the electrode-holder 58 is limited by the stop 11. If the pressure within the chamber 18 is still being increased the piston 13 and the piston-rod 15 cause the rod-support 22 to be displaced upwards against the force of the springs 24. This upwards displacement of the rod-support 22 causes the shaft 20 to be moved upwards by means of the coarse-adjustment unit 26 and the fine-adjustment unit 28. This vertical movement of the shaft 20 effects the control unit 8 causing a variation of the eccentricity of the electrode-holder 58 with respect to the working-cylinder 2.

As can be seen, the beginning or position for zero eccentricity is dependent on the adjustment of the fine- and coarse-adjustment units 26 and 28, so that horizontal incisions with or without a vertical component may be eroded.

The unique factor for vertical components is the adjustment of the coarse- and the fine-adjustment units 26 and 28 because the variation of eccentricity can be so chosen that this variation begins while vertical movement of the working-cylinder, i.e. before the vertical movement is limited by means of the stop 11, thus achieving an inclined movement of the electrode-holder 58 and therefore of the electrode. This inclined movement of the electrode, i.e. combined horizontal and vertical movement at the same time, is terminated when the vertical movement of the working cylinder is limited by means of the stop 11. After this limitation, the movement of the electrode is only horizontal.

The angle of such inclined surfaces to be eroded may be varied within a wide range by means of a simultaneous control of the main cylinder carrying the housing 1 and the working cylinder 2 thus achieving even curved surfaces on the work piece.

I claim:

1. A device for eroding a work piece wall by electrical discharge between the work piece and an electrode, the device comprising a housing, a working cylinder mounted for axial to-and-fro movement in said housing, stops for limiting axial movement of said working cylinder in said housing, a hollow support fixed to one end of said cylinder and formed with a cylindrical chamber co-axial with said working cylinder, a piston in said cylinder, a piston rod fixed to said piston and extending through the end of said cylinder remote from said support, an abutment member forming part of said housing, a rod-support fixed to said piston rod and cooperating with said abutment member for limiting axial movement of said piston and said piston rod relative to said housing, a straight axis shaft adjustably fixed coaxially with said piston and said piston rod for limited axial movement in relation thereto and extending into said cylindrical chamber, two closure members respectively closing opposite ends of said cylinder whereby selective admission to spaces respectively between said piston and each closure member can move said cylinder in either longitudinal direction, an electrode-holder mounted at the end of said support remote from said cylinder, bearing means interposed between said support and said electrode holder permitting orbital movement at a variable radius about said shaft axis in a plane to which said shaft axis is perpendicular, means for effecting said orbital movement, and a control unit comprising a cam unit rotatable on said electrode-holder about an axis at said variable radius from said shaft axis, and a rotor, rotatable on said shaft but axially fixed in relation thereto, coacting with said cam unit for adjusting said variable radius in accordance with the axial position of said rotor relative to said cam unit, so that by introducing a medium into one of said spaces the said working cylinder is moved in one axial direction, while said rod-support is stationary against said abutment member, for axially advancing said electrode-holder together with said rotor and said shaft until the latter reaches its limit of axial movement, and for then further advancing said electrode-holder without said rotor and said shaft so that said variable radius is simultaneously adjusted, and when said working cylinder reaches its limit of axial movement said medium is effective to retract said piston and said piston rod together with said shaft and said rotor for further adjusting said variable radius without axial movement of said electrode-holder relative to said housing.

2. A device according to claim 1, including stops for limiting the axial movement of said working cylinder in each direction of movement thereof, and means resiliently holding said rod-support against said abutment member, the arrangement being such that when excessive pressure arises in the one of said spaces, said rod-support can yield against said resilient means and away from said abutment member.

3. A device according to claim 1, including linear rolling-bearing guides interposed between said housing and said working cylinder for maintaining the orientation of said cylinder about its axis strictly constant while said cylinder moves axially.

4. A device according to claim 1, in which said shaft extends axially through said piston rod, and in which the device includes means for adjustably fixing the end of said shaft remote from said support to said piston rod, said fixing means including a unit for coarsely adjusting and a unit for finely adjusting the position of said shaft longitudinally in said piston rod.

5. A device according to claim 4, in which said coarse adjusting unit comprises a threaded pin fixed coaxially on said shaft and a nut threaded on said pin and means interposed between said nut and said piston rod whereby said nut can be held fixed with respect to said piston rod.

6. A device according to claim 4, in which said fine adjusting unit comprises a first member located axially on said shaft, a second member fixed to said piston rod, said first and second members presenting opposed surfaces and a wedging member formed with opposite surfaces respectively engaging said opposed surfaces, said surfaces being disposed so that adjusting movement of said wedging member transversely to said shaft effects fine longitudinal adjustment of said shaft with respect to said piston rod.

7. A device according to claim 1, in which said means for effecting said orbital movement comprise power transmission means, mounted on said electrode-holder, for rotating said cam unit, said cam unit having a cam track inclined to the axis of rotation of said cam unit in sliding connection with a track on said rotor inclined to said axis of said shaft.

8. A device according to claim 1, in which said bearing means include a first sliding member mounted to slide in a first straight line on said support, a second sliding member mounted to slide in a second straight line on said first sliding member perpendicular to said first straight line, said first sliding member being formed with a slot parallel to said second straight line and said second sliding member being formed with a slot parallel to said first straight line, and said cam unit being formed with a journal projecting through and engaging both said slots.

9. A method of eroding a work piece wall by electrical discharge between the work piece and an electrode mounted on an electrode-holder for movement along the longitudinal axis of the electrode as well as in a plane to which said longitudinal axis is perpendicular, the method comprising the steps of moving the electrode-holder relatively to the work piece to bring the electrode rectilinearly to the plane of the required erosion machining, adjusting the clearance between the electrode and the work piece within said plane to a required value by adjusting a radial distance of the electrode from an axis of a support for the electrode-holder, driving the electrode-holder to orbit said axis of said support with the electrode at said radial distance while the electrode is eroding the work piece, varying said radial distance by longitudinal movement of a member along said axis of said support according to a fixed ratio between this movement and said radial distance, and effecting said longitudinal movement of said member relative to said support first by moving said support and holding said member stationary relative to the work piece so that said radial distance is varied as a function of longitudinal movement of said electrode, and thereafter by holding said support stationary and moving said member relative to the work piece so that said radial distance is varied without longitudinal movement of said electrode.

* * * * *